United States Patent
Gibbs et al.

(10) Patent No.: US 10,135,372 B2
(45) Date of Patent: Nov. 20, 2018

(54) METHODS AND APPARATUS FOR SOFT OPERATION OF TRANSFORMERS USING AUXILIARY WINDING EXCITATION

(71) Applicant: Eaton Corporation, Cleveland, OH (US)

(72) Inventors: Irving Albert Gibbs, Mills River, NC (US); Thomas Arthur Farr, Candler, NC (US)

(73) Assignee: Eaton Intelligent Power Limited (IE)

( * ) Notice: Subject to any disclaimer, the term of this patent is extended or adjusted under 35 U.S.C. 154(b) by 0 days.

(21) Appl. No.: 15/421,819

(22) Filed: Feb. 1, 2017

(65) Prior Publication Data
US 2017/0149366 A1    May 25, 2017

Related U.S. Application Data

(63) Continuation-in-part of application No. PCT/US2015/056547, filed on Oct. 21, 2015, which
(Continued)

(51) Int. Cl.
*H02P 13/12* (2006.01)
*H02P 1/16* (2006.01)
(Continued)

(52) U.S. Cl.
CPC .............. *H02P 13/12* (2013.01); *H02H 1/043* (2013.01); *H02H 7/04* (2013.01); *H02H 9/002* (2013.01);
(Continued)

(58) Field of Classification Search
CPC .................................. H02P 13/12; H02P 1/16
(Continued)

(56) References Cited

U.S. PATENT DOCUMENTS 4,744,020 A * 5/1988 Cavagnolo ............ H02M 3/338
                                                          323/289
4,837,497 A * 6/1989 Leibovich ................. G05F 3/04
                                                          323/247
(Continued)

FOREIGN PATENT DOCUMENTS
WO    WO 2016/099651 A1    6/2016

OTHER PUBLICATIONS

Barrow, Abdou, "Assembling and commissioning a WEG MV01 medium voltage VFD," EMA, Inc., http://www.emainc.net/newsletter/assembling-and-commissioning-a-weg-mv01-medium-v . . . , pp. 103.
(Continued)

*Primary Examiner* — David S Luo
(74) *Attorney, Agent, or Firm* — Ward and Smith, P.A.

(57) ABSTRACT

An apparatus includes a magnetizing circuit configured to be coupled to a transformer and to selectively provide a magnetizing current to the transformer and a control circuit configured to cause the magnetizing circuit to provide the magnetizing current following disconnection of the primary winding of the transformer from the power source. The magnetizing circuit may be configured to provide the magnetizing current from a first source following disconnection of the primary winding from a second source. The transformer may include a first transformer and the apparatus may further include a second, higher impedance transformer coupled between the second source and the first transformer. In further embodiments, the magnetizing circuit may include a solid-state converter.

18 Claims, 7 Drawing Sheets

Related U.S. Application Data is a continuation of application No. 14/570,377, filed on Dec. 15, 2014, now Pat. No. 9,337,762.

(51) Int. Cl.
| | | |
|---|---|---|
| *H02M 1/36* | (2007.01) | |
| *H02M 1/40* | (2007.01) | |
| *H02H 9/00* | (2006.01) | |
| *H02H 7/04* | (2006.01) | |
| *H02H 1/04* | (2006.01) | |
| *H02P 27/06* | (2006.01) | |

(52) U.S. Cl.
CPC ............... *H02M 1/36* (2013.01); *H02M 1/40* (2013.01); *H02P 1/16* (2013.01); *H02P 27/06* (2013.01)

(58) Field of Classification Search
USPC ................................ 318/400.3, 400.01, 700
See application file for complete search history.

(56) References Cited

U.S. PATENT DOCUMENTS

| | | |
|---|---|---|
| 7,511,975 B2 | 3/2009 | Hammond |
| 7,880,343 B2 | 2/2011 | Kleinecke et al. |
| 7,965,529 B2 | 6/2011 | Gibbs et al. |
| 8,199,542 B2 * | 6/2012 | Breitmaier ............. H02M 7/17 363/125 |
| 8,223,515 B2 | 7/2012 | Abolhassani et al. |
| 9,337,762 B1 | 5/2016 | Gibbs et al. |
| 2008/0258672 A1 | 10/2008 | Osman et al. |
| 2012/0032512 A1 | 2/2012 | Aiello et al. |

OTHER PUBLICATIONS

Siemens, "Applications and Advanced Features," NXG Control Manual, Chapter 5, pp. 5-1 through 5-120, A1A19001588: Version 4.0.

Hitachi, Ltd., "HIVECTOL-HVI," Medium Voltage Multi-level IGBT Drives, Jun. 2008, pp. 1-16, http://www.hitachi.com/businesses/infrastructure/pdf/hvi_1209_en_a.pdf.

* cited by examiner

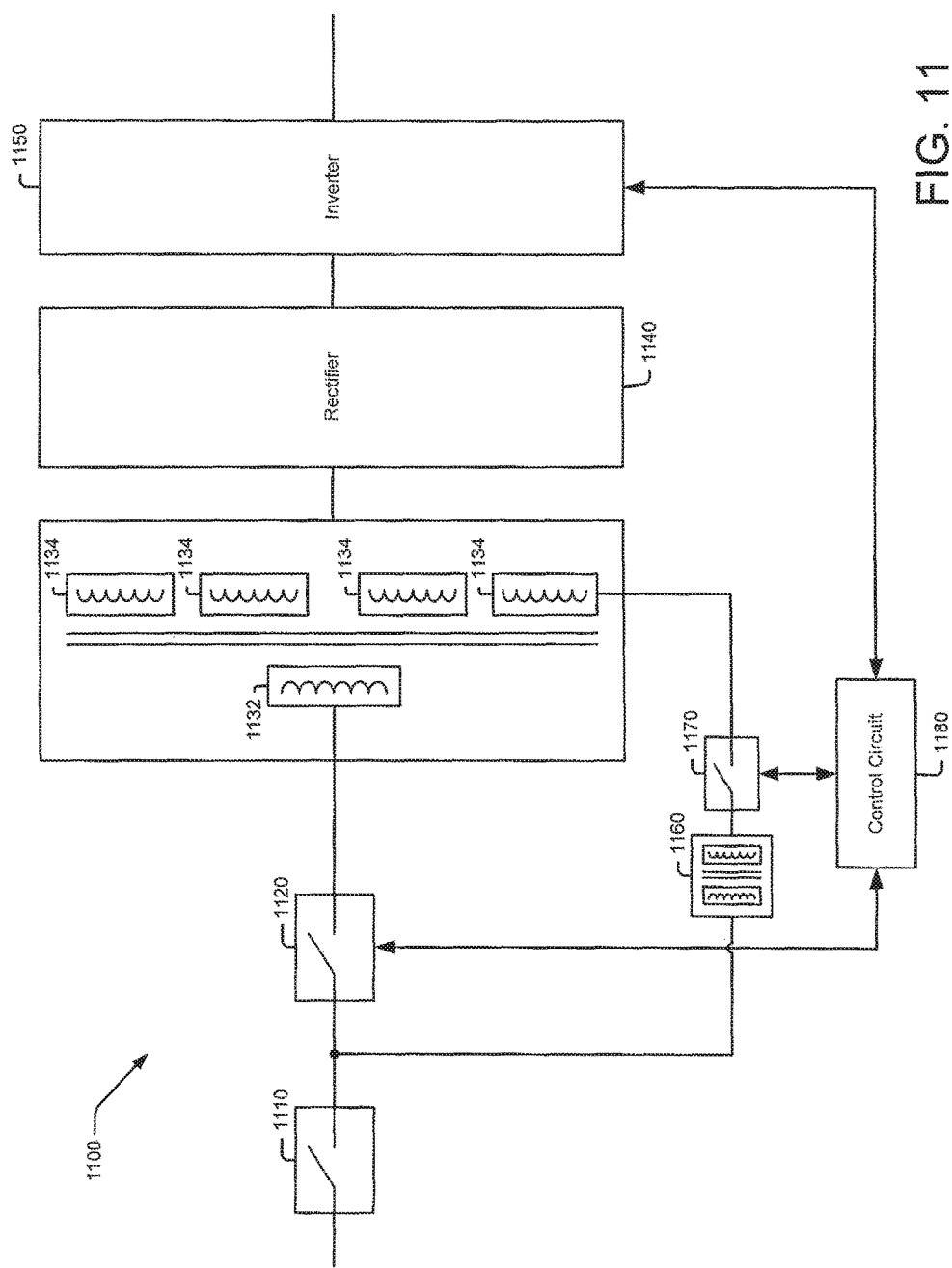

METHODS AND APPARATUS FOR SOFT OPERATION OF TRANSFORMERS USING AUXILIARY WINDING EXCITATION

RELATED APPLICATIONS

This application is a continuation-in-part of PCT Application No. PCT/US2015/056547, filed Oct. 21, 2015 which claims the benefit of U.S. patent application Ser. No. 14/570,377, filed Dec. 15, 2014, now U.S. Pat. No. 9,337,762, issued May 10, 2016, the disclosures of all which are hereby incorporated by reference in their entirety.

BACKGROUND

The inventive subject matter relates to electrical apparatus and methods of operating the same and, more particularly, to apparatus and methods for controlling transformers.

Electrical loads are commonly connected to a power distribution system using transformers. For example, commercial and residential loads are typically connected to the electrical grid using transformers that provide a reduced voltage to premises equipment from relatively high voltages that are used in the distribution system. Transformers may also be used to provide isolation between a power source and a load. For example, industrial electrical equipment, such as adjustable frequency motor drives, may include input transformers that are used to provide isolation for drive electronics.

Relatively large inrush currents may develop when such transformers are initially connected to a power source using a contactor or similar switching device. These inrush currents can be several times greater than the currents generated at steady state, and can cause circuit interruption devices, such as circuit breakers or fuses, to inadvertently operate. Techniques for reducing such inrush currents by pre-energizing a transformer via a high-impedance source are described, for example, in U.S. Pat. No. 9,337,762 to Gibbs et al.

SUMMARY

Some embodiments of the inventive subject matter provide methods including providing a magnetizing current to a transformer following disconnection of a primary winding of the transformer from a power source. Providing the magnetizing current to a transformer following disconnection of a primary winding of the transformer from the power source may include providing the magnetizing current from a first source following disconnecting the primary winding from a second source. The transformer may include a first transformer and the first source may include a second transformer coupled between the second source and the first transformer. The second transformer may have a greater impedance than the first transformer.

According to further embodiments, providing the magnetizing current from the first source following disconnecting the primary winding from the second source may include electrically coupling the first source to the primary winding and/or a secondary winding of the transformer while the primary winding is electrically coupled to the second source, electrically decoupling the second source from the primary winding while the first source remains electrically coupled to the secondary winding, and electrically decoupling the first source from the secondary winding. Electrically coupling the first source to the primary winding and/or a secondary winding of the transformer while the primary winding is electrically coupled to the second source may include coupling the second source to the secondary winding via a circuit having a greater impedance than the transformer. The transformer may include a first transformer, and electrically coupling the first source to the primary winding and/or a secondary winding of the transformer while the primary winding is electrically coupled to the second source may include coupling the second source to the secondary winding via a second transformer. The second transformer may have a greater impedance than the first transformer.

Further embodiments of the inventive subject matter provide an apparatus including a magnetizing circuit configured to be coupled to a transformer and to selectively provide a magnetizing current to the transformer and a control circuit configured to cause the magnetizing circuit to provide the magnetizing current prior to connection of a primary winding to a power source or following disconnection of the primary winding of the transformer from the power source. The magnetizing circuit may be configured to provide the magnetizing current from a first source prior to connection of the primary winding to a second source or following disconnection of the primary winding from the second source. The transformer may include a first transformer and the apparatus may further include a second transformer coupled between the second source and the first transformer. The second transformer may have a greater impedance than the first transformer. In further embodiments, the magnetizing circuit may include a solid-state converter.

In some embodiments, the control circuit may be configured to cause the magnetizing circuit to electrically couple the first source to the primary winding and/or a secondary winding of the transformer while the primary winding is electrically coupled to the second source, to cause a switch to electrically decouple the second source from the primary winding while the first source remains electrically coupled to the secondary winding, and to cause the magnetizing circuit to electrically decouple the first source from the secondary winding after the second source has been decoupled from the primary winding. The magnetizing circuit may be configured to electrically couple the second source to the secondary winding via a circuit having a greater impedance than the transformer. For example, the transformer may include a first transformer and the magnetizing circuit may include a second transformer and a switch configured to electrically couple the second source to the secondary winding via the second transformer.

Still further embodiments provide a motor drive including a transformer, a rectifier having an input coupled to a secondary of the transformer, and an inverter having an input coupled to an output of the rectifier and an output configured to be coupled to a motor. The motor drive further includes a magnetizing circuit configured to be coupled to the transformer and to selectively provide a magnetizing current to the transformer, a switch configured to couple and decouple a power source to and from a primary winding of the transformer, and a control circuit operatively associated with the switch and the magnetizing circuit and configured to cause the magnetizing circuit to provide the magnetizing current prior to connection of a primary winding to a power source or following disconnection of the primary winding of the transformer from the power source.

BRIEF DESCRIPTION OF THE DRAWINGS

FIG. 11 is a schematic diagram illustrating a motor drive with a magnetizing circuit according to further embodiments.

DETAILED DESCRIPTION

Figure 1:
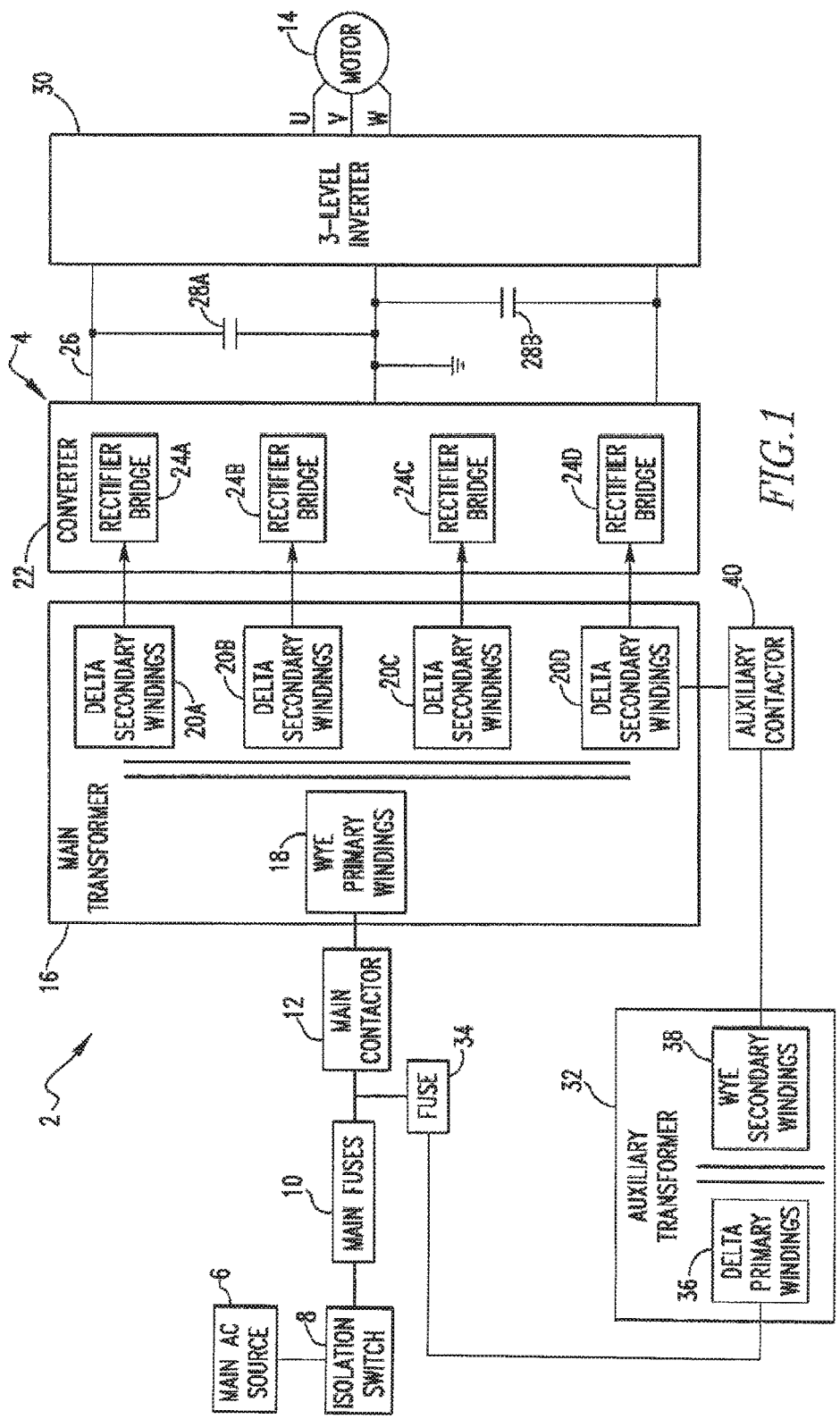
FIG. 1 is a schematic diagram of an electrical system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises,"'including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As used herein, the term "set of windings" shall mean a group of one or more windings such as a group of one or more primary windings or a group of one or more secondary windings.

Some embodiments provide apparatus and methods for reducing and/or eliminating inrush current in electrical system by charging or magnetizing an input transformer, such as, without limitation, an isolation transformer of a VFD, of the electrical system before the electrical system is energized by a main AC source (e.g., such as the main electrical grid). In particular, and as described in greater detail herein in the various exemplary embodiments, the disclosed concept provides a system and method wherein a transformer is charged or magnetized in advance of the system being fully energized in such a manner that the flux and voltage of the primary winding or windings of the transformer are in phase with the main AC source that is soon to be applied to the transformer.

FIG. 1 is a schematic diagram of an electrical system 2 according to some embodiments which implements the method for reducing and/or eliminating inrush current. As seen in FIG. 1, system 2 includes a variable frequency drive 4 that is fed by a main AC source 6, such as the main electrical grid, through an isolation switch 8, main fuses 10, and a main contactor 12. In the non-limiting exemplary embodiments, main AC source 6 is a 4160V, poly-phase (e.g., three-phase) AC input. Also in the non-limiting exemplary embodiments, variable frequency drive 4 is used to drive a poly-phase motor 14.

Variable frequency drive 4 includes a 3-phase, phase shifting main transformer 16. In the non-limiting, exemplary embodiments, main transformer 16 is a wye-delta transformer having a set of wye-connected primary windings 18 and a number of sets of delta-connected secondary windings 20. In the exemplary embodiment, main transformer 16 is a 24-pulse transformer and includes four sets of delta-connected secondary windings 20, labeled 20A, 20B, 20C, and 20D. In the non-limiting, exemplary embodiments, each set of delta-connected secondary windings 20 comprises a set of extended delta windings, and the voltage at delta-connected secondary winding 20A is phase shifted +22.5°, the voltage at delta-connected secondary windings 20B is phase shifted −7.5°, the voltage at delta-connected secondary windings 20C is phase shifted +7.5°, and the voltage at delta-connected secondary windings 20D is phase shifted −22.5°. As seen in FIG. 1, a converter 22 is coupled to delta-connected secondary windings 20A-20D and receives the 3-phase AC output thereof. Converter 22 has four AC to DC rectifier bridges 24, labeled 24A, 24B, 24C and 24D, arranged in series connection creating two twelve pulse rectifiers which result in 24-pulse harmonic mitigation on the primary of main transformer 16. Converter 22 thus converts the 3-phase AC output present on delta-connected secondary windings 20A-20D to DC power.

The output of converter 22 is coupled to a DC link 26 (sometimes also referred to as a DC bus) having capacitors 28A and 28B. The output of DC link 26 is coupled to the input of an inverter 30. In the exemplary embodiment, inverter 30 is a 3-level inverter such as a 3-level NPC inverter, although it will be understood that other suitable inverter topologies may also be used. As is known in the art, inverter 30 converts the DC power on DC link 26 to 3-phase quasi-sinusoidal AC power (see phases U, V, W in FIG. 1) which is provided to poly-phase motor 14.

Electrical system 2 further includes a 3-phase, phase shifting auxiliary transformer 32 which, as described herein, is used to magnetize main transformer 16 of variable frequency drive 4 before variable frequency drive 4 is energized by main AC source 6 in order to reduce and/or eliminate the inrush current into variable frequency drive 4. The phase shifting of auxiliary transformer 32 is chosen so as to match the phase shifting of main transformer 16. Auxiliary transformer 32 is electrically connected between main fuses 10 and main contactor 12 through a fuse 34. Thus, auxiliary transformer 32 is structured to receive, on the primary thereof, the voltage from main AC source 6. In the non-limiting, exemplary embodiments, auxiliary transformer 32 is a delta-wye transformer having a set of delta-connected primary windings 36 and a set of wye-connected secondary windings 38. In the exemplary embodiments, auxiliary transformer 32 is a step down transformer that converts the voltage from main source 6 to a lower voltage. In the non-limiting exemplary embodiments, auxiliary transformer is structured to output approximately 300V AC on the set of wye-connected windings 38 when a 4160V AC voltage is applied to delta-connected primary windings 36. It will be understood, however, that this is meant to be exemplary only and that other transformer ratios may also be employed within the scope of the inventive subject matter.

As seen in FIG. 1, wye-connected secondary windings 38 are coupled to a first side of a 3-phase auxiliary contactor 40. In the non-limiting, exemplary embodiments, auxiliary contactor 40 is a low voltage contactor. The second side of auxiliary contactor 40 is coupled to one of the sets of delta-connected secondary windings 20 of main transformer 16. In the exemplary embodiment, the second side of auxiliary contactor 40 is coupled to the set of delta-connected secondary windings 20D, although it will be understood that this is exemplary only and that the connection just described may be made to any of the other sets of delta-connected secondary windings 20, or even to the set of wye-connected primary windings 18.

Figure 2:
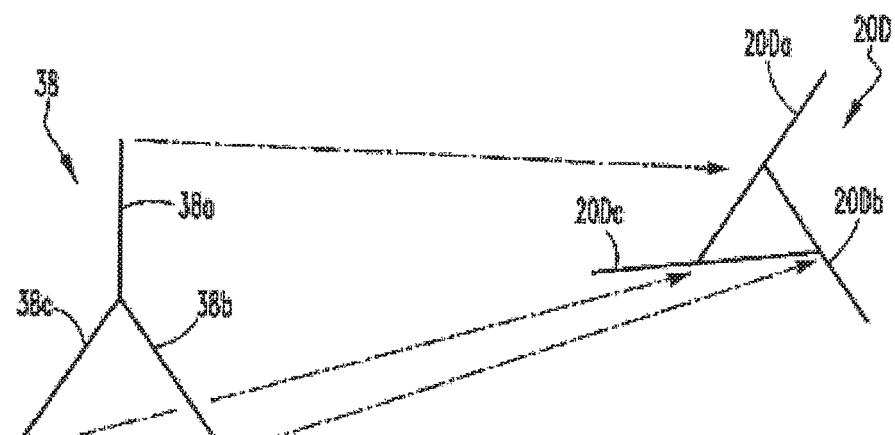
FIG. 2 is a schematic representation illustrating an example of connection of an auxiliary transformer to windings of a main input transformer of the system of FIG. 1 according to further embodiments.

FIG. 2 is a schematic representation illustrating how the connection of the set of wye-connected secondary windings 38 is connected to the set of delta-connected secondary windings 20D through auxiliary contactor 40 according to some exemplary embodiments. The set of wye-connected secondary windings 38 includes windings 38 a, 38 b, and 38 c, and the delta-connected secondary windings 20D includes extended windings 20Da, 20Db and 20Dc. As seen in FIG. 2, winding 38 a is connected at the junction of winding 20Da and 20Db, winding 38b is connected at the junction of winding 20Dc and 20Db, and winding 38C is connected to the junction of winding 20Dc and 20Da.

Again, it will be appreciated that the particular configurations described herein are exemplary only, and that other connection configurations are possible within the scope of the inventive subject matter. For example, and without limitation, main transformer 16 may be a transformer other than a wye-delta transformer and auxiliary transformer 32 may be a transformer other than a delta-wye transformer.

In operation, when variable frequency drive 4 is to be "turned on", main contactor 12 is moved to an open position and auxiliary contactor 40 is moved to a closed position. Isolation switch 8 may then be closed, which causes the voltage of main AC source 6 to be applied to the set of delta-connected primary windings 36 of auxiliary transformer 32. This will result in a voltage being induced in the set of wye-connected secondary windings 38 of auxiliary transformer 32. That voltage will be applied to the set of delta-connected secondary windings 20D of main transformer 16 through auxiliary contactor 40 in order to magnetize main transformer 16. Because of the relatively high impedance of auxiliary transformer 32, main transformer 16 will be magnetized softly at less than the rated current. Once main transformer 16 is sufficiently magnetized, main contactor 12 is closed such that the voltage of main AC source 6 will be applied to the already magnetized set of wye-connected primary windings 18 of main contactor 16. After main contactor 12 is closed, then auxiliary contactor 40 is opened. When main contactor 12 is closed, the phase of the set of wye-connected primary windings 18 will match the phase of the voltage of main AC source 6 being applied. Because the wye-connected primary windings 18 have already been magnetized as just described, the inrush current into variable frequency drive 4 will be reduced and/or eliminated. When auxiliary contactor 40 is closed, DC link 26 (the DC bus) is charged.

The determination as to when the main transformer 16 is sufficiently magnetized such that full energizing of variable frequency drive 4 may begin may be made in any of a number of ways, including monitoring the voltage of the DC link 26 and determining that sufficient magnetization has occurred when that voltage reaches a certain threshold level, monitoring the voltage of the set of wye-connected primary windings 18 and determining that sufficient magnetization has occurred when that voltage reaches a certain threshold level, or measuring the current flowing into auxiliary transformer 32 and determining that sufficient magnetization has occurred when that current settles, meaning that it is no longer changing to a significant degree.

Thus, embodiments of the inventive subject matter provide mechanisms and methodology by which a transformer, such as main transformer 16, may be magnetized in advance of being fully energized in a manner that eliminates and/or reduces the inrush current into the transformer. Another potential benefit of the mechanisms and methodology according to some embodiments is that DC link 26 will also be charged, thus eliminating the need for a pre-charge circuit. Furthermore, by adding additional windings to auxiliary transformer 32, it may be used for other purposes, such as providing power for a cooling fan for variable frequency drive 4. Still other potential benefits include reduced arc flash incident energy levels because protection relays can be set with lower instantaneous current trip settings. This feature provides quicker fault clearing time and lower arc flash ratings for the equipment and personnel protective equipment.

Figure 3:
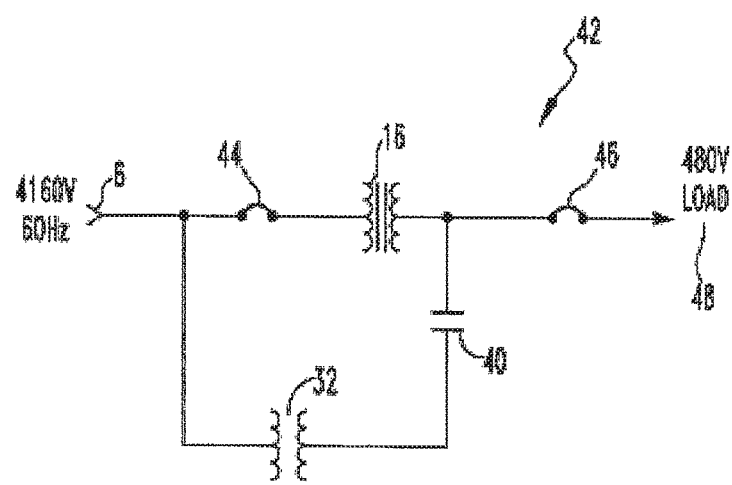
FIG. 3 is a schematic diagram of an electrical distribution system according to some embodiments.

FIG. 3 is a schematic diagram of an electrical distribution system 42 according to some exemplary embodiments. Electrical distribution system 42 is similar to electrical system 2 described elsewhere herein, and like components are labeled with like reference numerals. However, while electrical system 2 employs the disclosed concept in connection with magnetizing an isolation transformer feeding a variable frequency drive, electrical distribution system 42 employs the disclosed concept in connection with magnetizing a main distribution transformer of electrical distribution system 42 for feeding a number of loads. In particular, as seen in FIG. 3, electrical distribution system 42 includes main AC source 6 as described herein, which, in the exemplary embodiments, is a 4160V, 60 Hz utility source, main transformer 16 as described herein, auxiliary transformer 32 as described herein, and auxiliary contactor 40 as described herein. Electrical distribution system 42 further includes a line breaker 44, which may be a contactor, a fused switch or a circuit breaker, a secondary breaker 46, and a load 48. Line breaker 44 is provided between the main AC source 6 and main transformer 16, and secondary breaker 46 is provided between main transformer 16 and load 48. In operation, in order to provide power to load 48, line breaker 44 and secondary breaker 46 are in an open condition. Auxiliary transformer 32 is then powered from main AC source 6. Auxiliary contactor 40 then connects the secondary of auxiliary transformer 32 to the secondary of main transformer 16. Line breaker 44 then closes with reduced or no inrush current. Next, auxiliary contactor 40 is opened and secondary breaker 46 is closed.

Further embodiments of the inventive subject matter arise from a realization that noise, current chopping and other transient effects arising from disconnecting a transformer from a main power source can be reduced by coupling relatively high-impedance magnetizing current source to the transformer concurrent with and immediately following disconnection of the transformer from the main power source. In some embodiments, the magnetizing current may be provided, by example, by an auxiliary high-impedance transformer that is coupled to the primary source. In other embodiments, an electronic source, such as a solid-state power converter, may be used to provide a high-impedance magnetizing current source. In some embodiments, a relatively high-impedance current source may be coupled to the transformer's secondary winding immediately preceding disconnection of the primary source from the transformer's primary winding, and the high-impedance current source may disconnected shortly after the primary source is disconnected from the primary winding.

Figure 4:
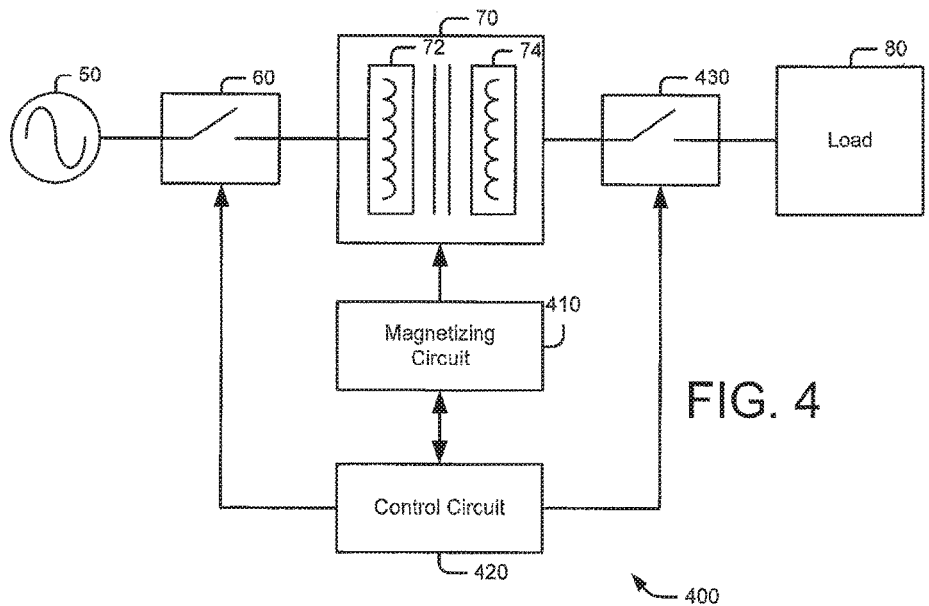
FIG. 4 is a schematic diagram illustrating an apparatus for controlling a transformer according to some embodiments of the inventive subject matter.

FIG. 4 illustrates an apparatus 400 for controlling operations of a transformer 70 and a disconnect switch 60 configured to connect and disconnect the transformer 70 to and from a main power source 50. The transformer 70 may be, for example, a distribution or other transformer in a power distribution system or an isolation transformer of a motor drive or other electrical component. The transformer 70 may include at least one primary winding 72 and at least one secondary winding 74. The at least one primary winding 72 and the at least one secondary winding 74 may have any of a number of different configurations including, but not limited to, delta and wye (star) configurations. The disconnect switch 60 may be any of a number of types of electrically controllable switching devices, including, but not limited, to contactors, electrically controlled circuit breakers, and the like.

The apparatus 400 includes a magnetizing circuit 410 configured to provide a magnetizing current to the transformer 70, and a control circuit 420 configured to control the magnetizing circuit 410 in coordination with the disconnect switch 60. For example, the control circuit 420 may be configured to provide a magnetizing current concurrent with and following disconnection of the transformer 70 by the disconnect switch 60, so as to reduce noise, current chopping and other undesirable effects associated with the disconnection. In some embodiments, for example, the control circuit 420 may cause the magnetizing circuit 410 to couple a magnetizing current source to the primary winding(s) 32 and/or the secondary winding(s) 34 of the transformer 70 prior to opening the disconnect switch 60, such that magnetizing current may be provided to the connected winding (s) during and after disconnection of the main power source 50 from the transformer 70. During this process, the control circuit 420 may isolate the load 80 from the transformer 70, e.g., using a switch 430. Sometime after the disconnect switch 60 has opened, the control circuit 420 may cause the magnetizing circuit 410 to disconnect the magnetizing current source from the primary winding(s) 32 and/or the secondary winding(s) 34 or otherwise discontinue provision of the magnetizing current.

It will be appreciated that the magnetizing circuit 410 may be implemented using any of a variety of different analog and/or digital circuit components. For example, as explained below, the magnetizing circuit 410 may include a high-impedance auxiliary transformer coupled to the primary source and used to apply a voltage to the transformer 70 to provide the magnetizing current. In some embodiments, the magnetizing circuit 410 may be a solid-state circuit (e.g., a current source inverter).

The control circuit 420 may be implemented using analog and/or digital circuitry, such as a microcontroller or other data processing device and associated peripheral circuitry. The control circuit 420 may be implemented in circuitry that performs other functions of a particular application in which the transformer is being used, such as inverter and other motor control functions in a motor drive.

Figure 5:
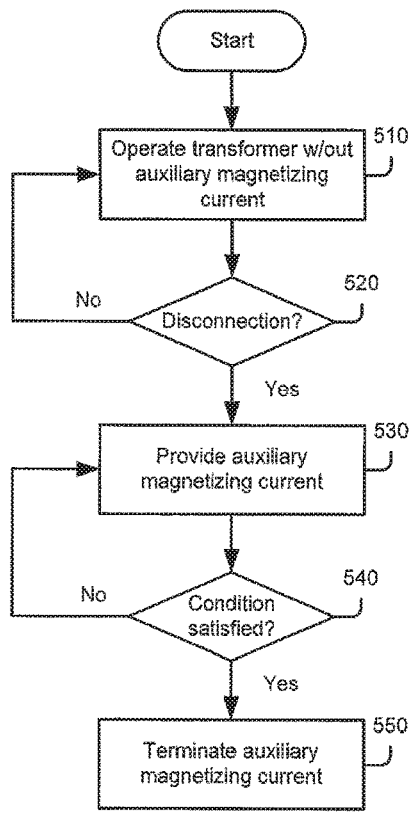
FIG. 5 is a flowchart illustrating operations of the apparatus of FIG. 1 according to some embodiments.

FIG. 5 illustrates operations of the apparatus 400 of FIG. 4 according to further embodiments. Initially, the transformer 70 is energized by the main power source 50 and provides power to the load 80 (block 510). Substantially concurrent with and following disconnection of the transformer 70 from the main power source 50, the control circuit 420 causes the magnetizing circuit 410 to provide a magnetizing current to the transformer 70 (blocks 520, 530). When a condition, such as lapse of a predetermined amount of time and/or an electronic parameter (e.g., a voltage or current of the transformer 70) meeting a certain criterion, the magnetizing current is terminated (blocks 540, 550).

It will be appreciated that the above-described operations may be performed in any of a number of different ways. For example, shortly before opening the disconnect switch 60 that feeds the transformer 70, the load 80 may be disconnected from the transformer 70 and a magnetizing current source may be coupled to the transformer 70 and used to maintain the magnetization of the transformer 70 through a transient period after the disconnection from the main power source 50. For example, in some embodiments described below, this may involve selectively coupling a high-impedance source, such as a high-impedance bypass transformer, between the main power source 50 and the transformer 70. In some embodiments, provision of a magnetizing current through a disconnecting event may involve controlling a solid-state current source that is coupled to a primary and/or second winding of the transformer. In such embodiments, the solid-state source may remain connected to the transformer 70, but may be selectively activated and de-activated to provide magnetizing current as needed. A magnetizing current may be maintained for a predetermined time interval after a disconnection operation for the transformer 70 and/or may be maintained responsive to some parameter (e.g., a voltage or a current).

The magnetizing current applied to the transformer 70 may coincide with application of a voltage on the at least one primary winding 72 substantially matching the voltage and phase of the voltage of the main power source 50 when the transformer 70 is disconnected from the main power source 50 by the disconnect switch 60, but it will be appreciated that, in some embodiments, magnetizing current may deviate from this criterion while still substantially providing benefits associated with the inventive subject matter. Apparatus according to the inventive subject matter may also be used to provide magnetizing current to suppress transient inrush currents when the transformer 70 is being connected to a power source (e.g., by closure of the disconnect switch 60 of FIG. 4), along lines described above and in U.S. Pat. No. 9,337,762 to Gibbs et al., the disclosure of which is incorporated herein by reference in its entirety.

Figure 6:
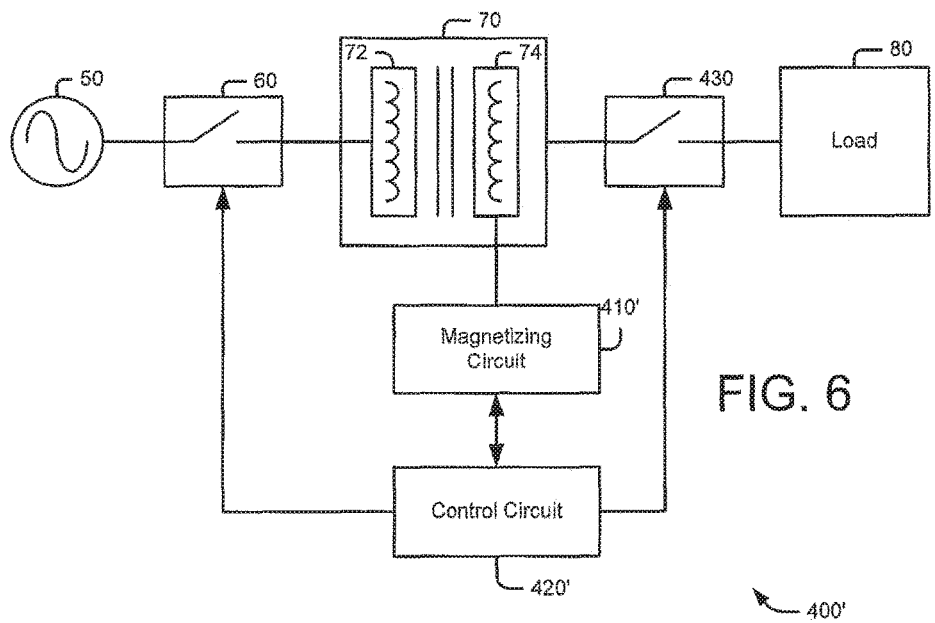
FIG. 6 is a schematic diagram illustrating an apparatus with a magnetizing circuit coupled to a transformer secondary according to further embodiments.

As noted above, a magnetizing current may be provided to primary and/or secondary windings of a transformer. Referring to FIG. 6, in some embodiments, a magnetizing circuit 410' of an apparatus 400' may be coupled to at least one secondary winding 74 of a transformer 70. A control circuit 420' may be configured to cause the magnetizing circuit 410' to provide a magnetizing current to the at least one secondary winding 74 in the manner described above with reference to FIGS. 4 and 5. It will be understood that the at least one secondary winding 74 may be a winding configured to be connected to the load 80, and that the connection of the magnetizing circuit 410' to the at least one secondary winding 74 may be a connection internal to the transformer 70 and/or an external connection to an output port of the transformer 70. In further embodiments, the at least one secondary winding 74 may be an auxiliary winding, i.e., an unloaded secondary winding that is magnetically coupled to the at least one primary winding 72 via a magnetic core of the transformer, but not configured to be electrically coupled to the load 80.

Figure 7:
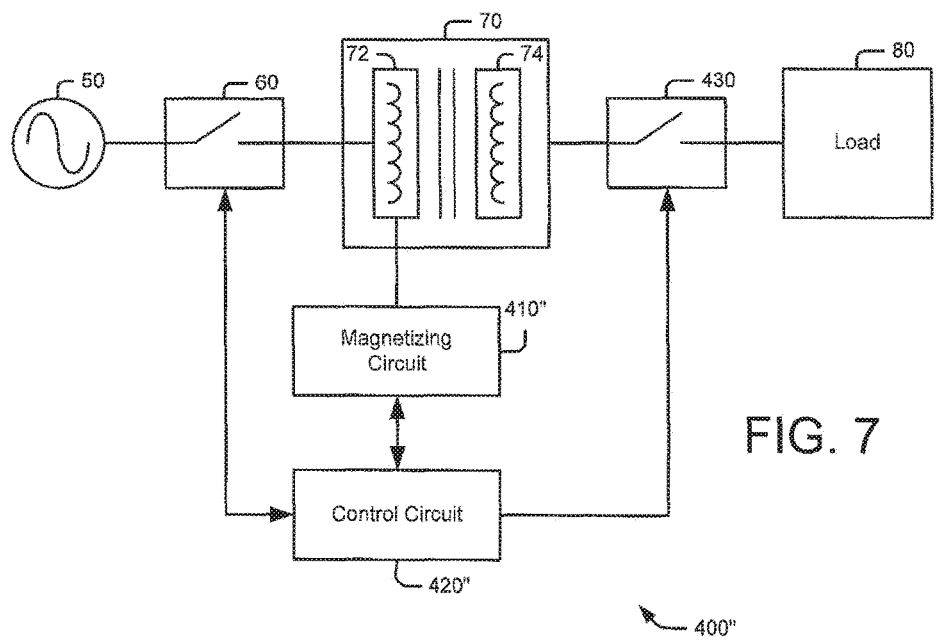
FIG. 7 is a schematic diagram illustrating an apparatus with a magnetizing circuit coupled to a transformer primary according to further embodiments.

As shown in FIG. 7, a magnetizing circuit 410" of apparatus 400" according to some embodiments may be electrically coupled to at least one primary winding 72 of the transformer 70, and a control circuit 420" may cause the magnetizing circuit 410" to provide a magnetizing current to the at least one primary winding 72 in the manner described above with reference to FIGS. 4 and 5. It will be understood that a connection of the magnetizing circuit 410" to the at least one primary winding 72 may be internal connection within the transformer 70 and/or an external connection to an input port of the transformer 70.

Figure 8:
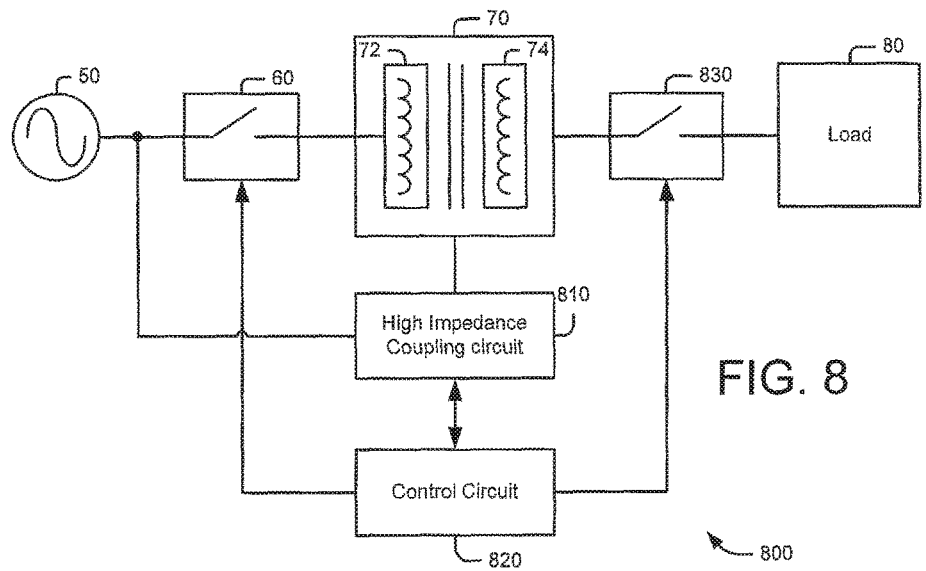
FIG. 8 is a schematic diagram illustrating an apparatus with a high-impedance coupling circuit for magnetizing a transformer according to some embodiments.

In some embodiments, a magnetizing current may be provided by a relatively high impedance coupling circuit connected to the main power source that feeds the primary winding of the transformer. Referring to FIG. 8, apparatus 800 may include a high-impedance coupling circuit 810 configured to be coupled to a main power source 50. A control circuit 820 may be configured to cause the high-impedance coupling circuit 810 to selectively provide a high-impedance coupling of the main power source 50 to the transformer 70 to provide a transformer magnetizing current in coordination with opening of the disconnect switch 60 in the manner described above with reference to FIGS. 4 and 5. Along lines discussed above, a switch 830 may be used to decouple the load 80 from the transformer 70 when the magnetizing current is being provided. As with the embodiments of FIGS. 6 and 7, the high-impedance coupling circuit 810 may be connected to at least one primary winding 72 and/or at least one secondary winding 74 of the transformer.

Figure 9:
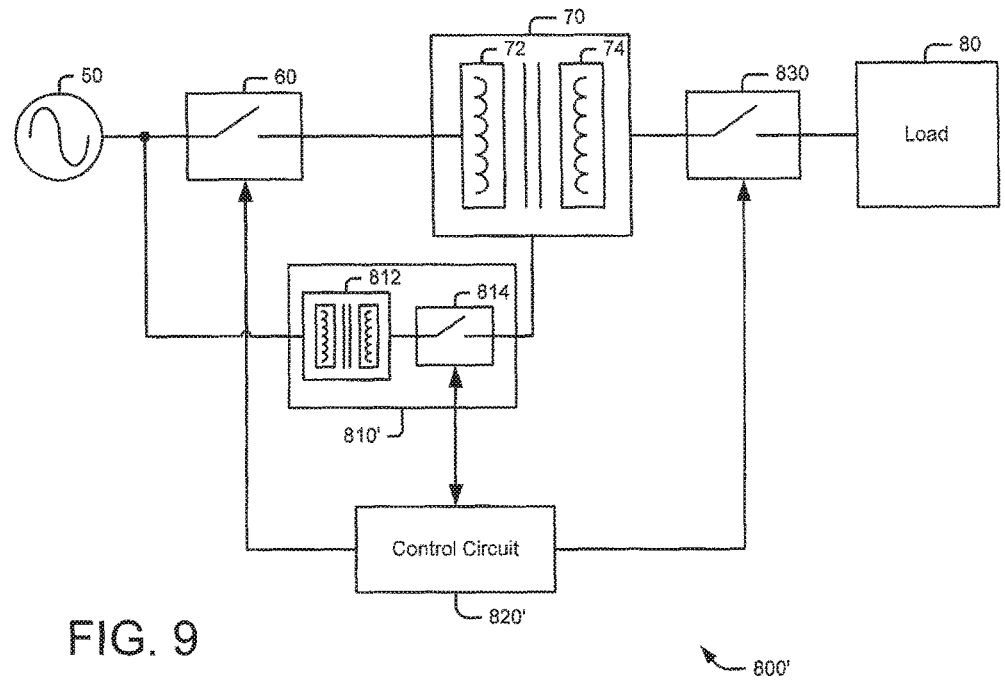
FIG. 9 is a schematic diagram illustrating an apparatus using an auxiliary transformer has a high-impedance coupling circuit according to further embodiments.

Referring to FIG. 9, in apparatus 800' according to some embodiments, a high-impedance coupling circuit 810' may include an auxiliary transformer 812 coupled to the main power source 50 and a switch 814 configured to couple and decouple the auxiliary transformer 812 to and from at least one secondary winding 74 of the main transformer 70. A control circuit 820' may control the switch 814 to provide a magnetizing current to the transformer 70 in coordination with the disconnect switch 60 in the manner described above with reference to FIGS. 4 and 5.

Figure 10:
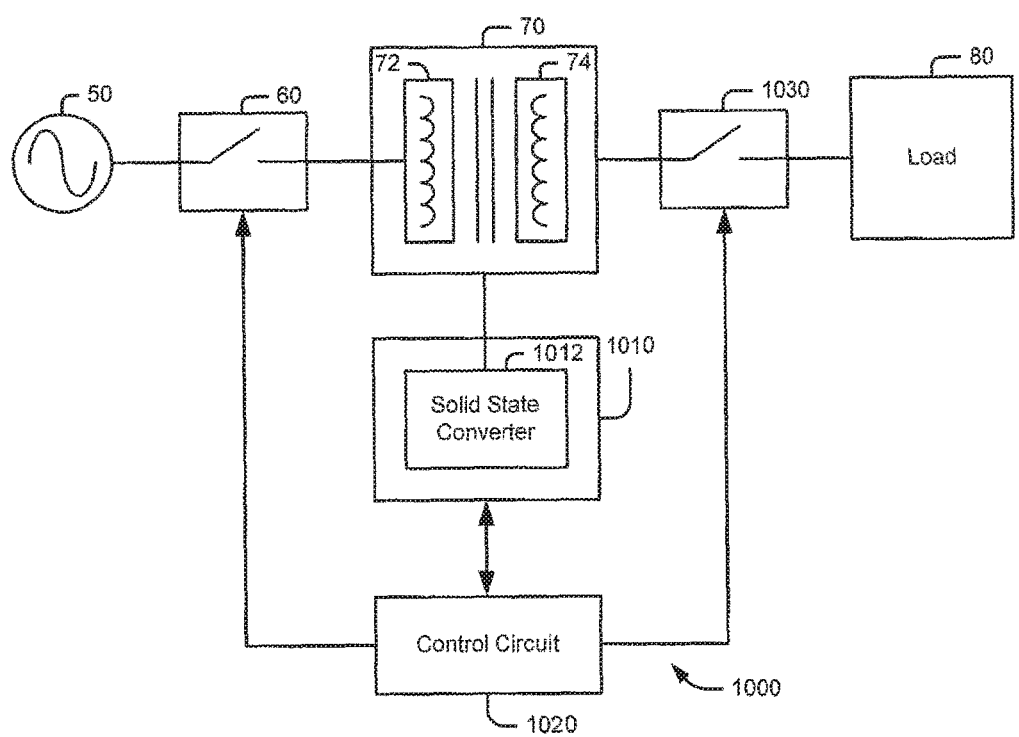
FIG. 10 is a schematic diagram illustrating an apparatus using an electronic current source as a magnetizing circuit according to some embodiments.

According to further embodiments, magnetizing current may be provided using solid-state circuitry. For example, referring to FIG. 10, an apparatus 1000 may include a magnetizing circuit 1010 with a solid state converter circuit 1022 (e.g., a controlled AC current source) coupled to at least one primary winding 72 and/or at least one secondary winding 74 of a transformer 70 in coordination with opening of a disconnect switch 60 under control of a control circuit 1020. A control circuit 1020 may be configured to cause the solid state converter circuit 1022 to selectively provide a magnetizing current in coordination with operation of a primary side disconnect switch 60 and disconnection of the load 80 using a switch 1030 along lines discussed above with respect to FIGS. 4 and 5.

It will be appreciated that magnetizing current may be provided in a number of other ways in some embodiments. For example, some embodiments may a use a magnetizing current source that provides a magnetizing current that is initially relatively high, and then decays shortly thereafter.

It will be appreciated that embodiments of the inventive subject matter may be used in any of a number of different applications. For example, some embodiments may be used in power distribution systems in conjunction with distribution transformers. Some embodiments, may be used in conjunction with isolation or other transformers in electrical equipment, such as motor drives, power supplies (e.g., uninterruptible power supplies), and the like.

For example, as shown in FIG. 11, a variable frequency drive (VFD) 1100 includes a converter chain including a 24-pulse rectifier 1140 configured to receive power from an input source via an isolation transformer 1130. An output of the 24-pulse rectifier 1140 is coupled to a multi-level inverter 1150 that is configured to drive a motor load. The isolation transformer 1130 includes a wye-connected primary winding 1132 that receives power through an isolation contactor 1110 and an input contactor 1120. Magnetizing current is provided to one of multiple delta-connected secondary windings 1134 coupled to the input of the 24-pulse rectifier 1140 via an auxiliary transformer 1160 and a third contactor 1170. A control circuit 1180 controls the third contactor 1170 in conjunction with the input contactor 1120 and the multi-level inverter 1150 (to decouple the motor load) to selectively provide a magnetizing current to suppress transients when disconnecting the isolation transformer 1130 in a manner along the lines described above with reference to FIGS. 4 and 5. The auxiliary transformer 1160 may have a wye-delta or delta-wye configuration such that it produces a voltage on the secondary winding 1134 that is substantially in phase with the voltage applied to the primary winding 1132. It will be appreciated that the control circuit 1180 may control various other functions of the VFD 1100, such as operations of the multi-level inverter 1150 and the input contactor 1120.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A method comprising:
providing a magnetizing current to a transformer from a first source following disconnection of a primary winding from a second source.

2. The method of claim 1, wherein the transformer comprises a first transformer and wherein the first source comprises a second transformer coupled between the second source and the first transformer.

3. The method of claim 2, wherein the second transformer has a greater impedance than the first transformer.

4. The method of claim 1, wherein the first source comprises a solid-state converter.

5. The method of claim 1, wherein providing the magnetizing current from a first source following disconnection of the primary winding from a second source comprises:
   electrically coupling the first source to the primary winding and/or a secondary winding of the transformer while the primary winding is electrically coupled to the second source,
   electrically decoupling the second source from the primary winding while the first source remains electrically coupled to the secondary winding; and
   electrically decoupling the first source from the secondary winding.

6. The method of claim 5, wherein the first source is configured to induce a flux in the transformer such that a voltage in the primary winding or the secondary wining is substantially in phase with a voltage applied by the second source.

7. The method of claim 5, wherein electrically coupling the first source to the primary winding and/or a secondary winding of the transformer while the primary winding is electrically coupled to the second source comprises coupling the second source to the secondary winding via a circuit having a greater impedance than the transformer.

8. The method of claim 5, wherein the transformer comprises a first transformer and wherein electrically coupling the first source to the primary winding and/or a secondary winding of the transformer while the primary winding is electrically coupled to the second source comprises coupling the second source to the secondary winding via a second transformer.

9. An apparatus comprising:
   a magnetizing circuit configured to be coupled to a transformer and to selectively provide a magnetizing current to the transformer; and
   a control circuit configured to cause the magnetizing circuit to provide the magnetizing current from a first source following disconnection of a primary winding of the transformer from a second source.

10. The apparatus of claim 9, wherein the transformer comprises a first transformer and wherein the apparatus further comprises a second transformer coupled between the second source and the first transformer.

11. The apparatus of claim 9, wherein the magnetizing circuit comprises a solid-state converter.

12. The apparatus of claim 9, wherein the control circuit is configured to cause the magnetizing circuit to electrically couple the first source to the primary winding and/or a secondary winding of the transformer while the primary winding is electrically coupled to the second source, to cause a switch to electrically decouple the second source from the primary winding while the first source remains electrically coupled to the secondary winding and to further cause the magnetizing circuit to electrically decouple the first source from the secondary winding after the second source has been decoupled from the primary winding.

13. The apparatus of claim 12, wherein the first source is configured to induce a flux in the transformer such that a voltage in the primary winding or the secondary winding is substantially in phase with a voltage applied by the second source.

14. The apparatus of claim 13, wherein the magnetizing circuit is configured to electrically couple the second source to the secondary winding via a circuit having a greater impedance than the transformer.

15. The apparatus of claim 14, wherein the transformer comprises a first transformer and wherein the magnetizing circuit comprises a second transformer and a switch configured to electrically couple the second source to the secondary winding via the second transformer.

16. A motor drive comprising:
   a transformer;
   a rectifier having an input coupled to a secondary of the transformer;
   an inverter having an input coupled to an output of the rectifier and an output configured to be coupled to a motor;
   a magnetizing circuit configured to be coupled to the transformer and to selectively provide a magnetizing current to the transformer;
   a switch configured to couple and decouple a power source to and from a primary winding of the transformer; and
   a control circuit operatively associated with the switch and the magnetizing circuit and configured to cause the magnetizing circuit to provide the magnetizing current following disconnection of the primary winding of the transformer from the power source.

17. The motor drive of claim 16, wherein the transformer comprises a first transformer and wherein the magnetizing circuit comprises a second transformer and a switch configured to electrically couple the second transformer between the power source and a primary winding or a secondary winding of the first transformer.

18. The motor drive of claim 17, wherein the second transformer has a greater impedance than the first transformer.

* * * * *